United States Patent
Drage

[11] 3,885,744
[45] May 27, 1975

[54] METHOD AND APPARATUS FOR CRUSHING AND SEPARATING SCRAP MATERIAL

[75] Inventor: David J. Drage, Park Forest, Ill.

[73] Assignee: Air Products and Chemicals, Inc., Allentown, Pa.

[22] Filed: May 20, 1974

[21] Appl. No.: 471,273

[52] U.S. Cl. ............... 241/23; 241/24; 241/29; 241/65; 241/DIG. 37
[51] Int. Cl. ............................................. B02c 21/00
[58] Field of Search ............ 241/14, 17, 18, 23, 24, 241/29, 65

[56] References Cited
UNITED STATES PATENTS

| | | | |
|---|---|---|---|
| 2,942,792 | 6/1960 | Anderson et al. | 241/14 |
| 3,081,954 | 3/1963 | Heckett | 241/24 X |
| 3,086,718 | 4/1963 | Lukas, Jr. | 241/24 |
| 3,666,185 | 5/1972 | Williams | 241/17 |
| 3,768,739 | 10/1973 | George | 241/65 |

Primary Examiner—Granville Y. Custer, Jr.
Attorney, Agent, or Firm—James C. Simmons; Barry Moyerman

[57] ABSTRACT

Scrap material, having components which are rendered brittle by freezing, is passed through a freezing zone at cryogenic temperatures to make said components temporarily non-ductile. The scrap is then crushed in a first comminution zone to a relatively small size. Thereafter, the scrap is sorted by a first air separator into streams (a) "dust" or fines, (b) a light fraction and (c) a heavy fraction. The heavy fraction is magnetically separated into magnetic and non-magnetic fractions. The non-magnetic and light fractions are combined and then crushed together in a second comminution zone to a smaller size. The discharge of this zone is sorted by a second air separator into streams (a) "dust" or fines, (b) a light fraction and (c) a heavy fraction. The second heavy fraction is magnetically separated into magnetic and non-magnetic fractions and the non-magnetic fraction is recycled through the second comminution zone. The second light fraction is fed to a third comminution zone for still further size reduction. After magnetic separation and further size reduction, which steps may be repeated as deemed desirable, based on the characteristics of the scrap and the size range of the desired products, non-magnetic metal values are recovered. The various magnetic fractions are recovered and the collected "dusts" or fines may also be subject to recovery of the metallic and non-metallic components thereof.

9 Claims, 1 Drawing Figure

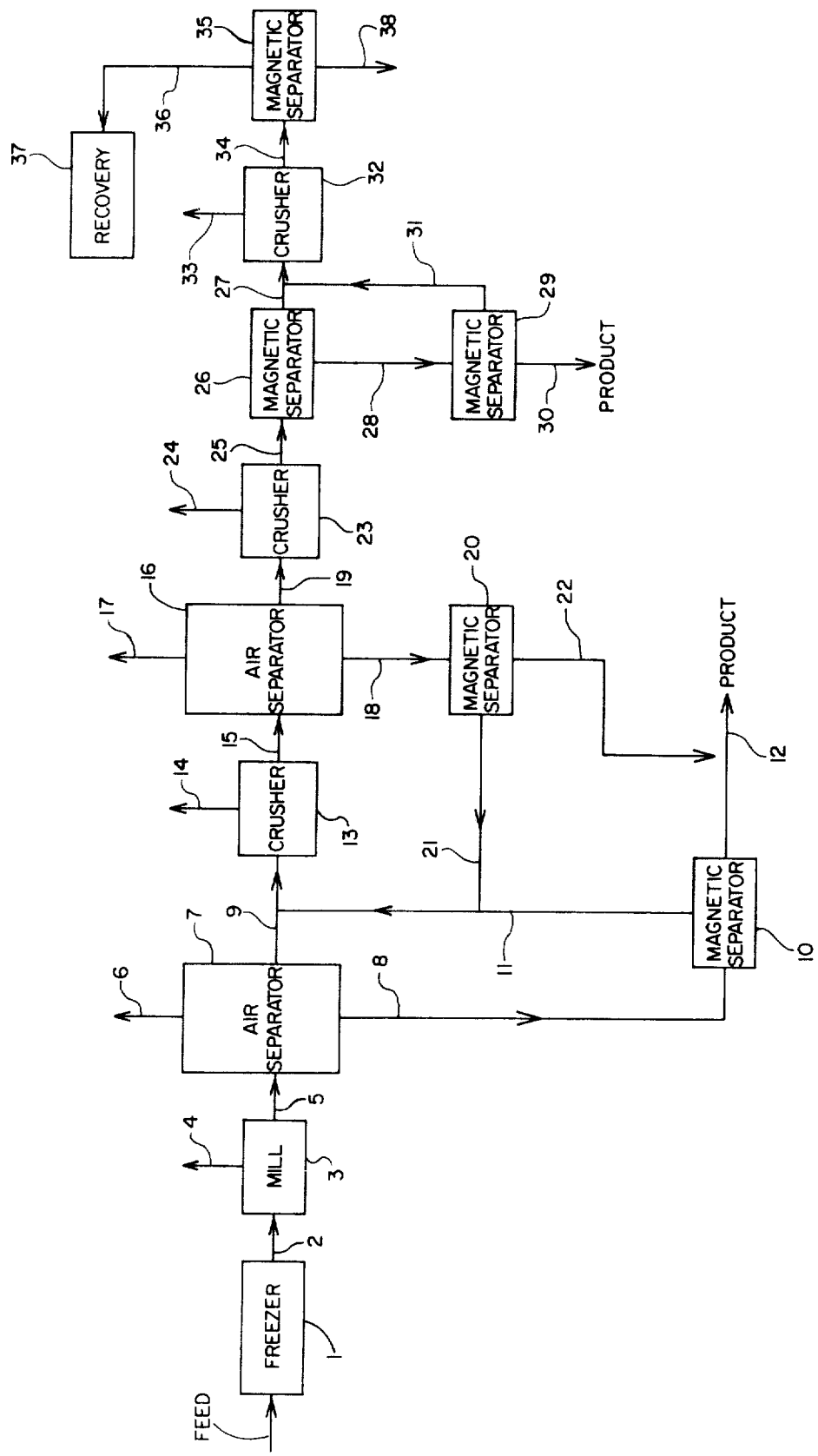

METHOD AND APPARATUS FOR CRUSHING AND SEPARATING SCRAP MATERIAL

BACKGROUND OF THE INVENTION

1. Field of the Invention

This invention relates to a process and apparatus for separating the components of bulky, essentially metallic scrap material and recovering the same. More particularly, it relates to the sequential cooling, comminuting and mechanical separation of scrap material to recover valuable portions thereof.

2. Description of the Prior Art

In light of the growing scarcity of primary raw materials, the recovery of metals from scrap material has become of increasing importance. Such recycling also helps prevent ecological trauma. However, much of the scrap available contains various metals and non-metals which are in such intimate mechanical association as to be not easily separable. For example, motor armatures comprise ferrous metals and nonferrous metals (e.g. copper and aluminum), insulation and the like. Yet recovery of the copper is difficult because of the way the armature is constructed.

Various methods employing cryogenic embrittlement have been proposed in scrap recovery such as those illustrated by the following U.S. Pat. Nos. 2,879,005; 3,614,001; 3,666,185; 3,718,284 and 3,768,739 as well as the relevant references cited therein. Additionally, U.S. Pat. No. 3,605,243 shows a method for separating zinc and aluminum from a base metal scrap.

The cryogenic process is very effective for rendering certain types of scrap brittle (i.e., those whose fracture mode changes from ductile to brittle in a temperature range referred to as the 'transition temperature' range) and thus enabling it to be fragmented. However, problems are encountered where the scrap contains significant amounts of metals which remain ductile at cryogenic temperatures. As one example, the copper in a scrap material containing copper and ferrous metal does not experience brittle fracture following cryogenic cooling. Instead, it tends to become flattened, sheared, stretched or otherwise plastically deformed during the self-same crushing operation which shatters the ferrous material. As a consequence, substantial portions of ferrous material are not liberated and amenable to economic recovery. They are, instead, mechanically entrapped by non-ferrous metal aggregates which encapsulate, entangle and make conventional sorting impossible.

It has been found, in accordance with the instant invention that in order to effectively separate copper and other ductile metals from the ferrous components of the scrap, the scrap must be passed through a series of comminutors in which it is crushed to smaller and smaller sizes. Intermediate the crushers there is separation of entangled materials and their recycle to the previous comminutor. One thus obtains product streams of materials which are mechanically disengaged from each other.

SUMMARY OF THE INVENTION

This invention provides apparatus and a method for separating metallic scrap material, comprising various metals and, possibly, non-metallics into its constituent component materials.

Briefly, the scrap is subjected to cooling, preferably utilizing a cryogenic fluid, and then charged to a first crusher or comminutor. The crusher discharge is separated into light and heavy fractions, with "dust" or fines also being removed. The heavy fraction is treated in a magnetic separator to recover a non-magnetic and a magnetic fraction. The term "non-magnetic" as used henceforth herein when speaking of scrap is to be understood to include truly non-magnetic particles as well as composite pieces which are relatively non-magnetic despite inclusion of magnetic portions, because they are mechanically associated with sufficient non-magnetic material to be separated by a magnetic separator into the non-magnetic fraction. The magnetic fraction is removed as a product of the process and may be sorted (e.g. hand picked) to remove any pieces containing copper, etc. which pieces may be recycled to the second crusher.

The non-magnetic fraction which contains the aluminum, copper and any other non-magnetic components is combined with the light fraction and with a subsequent non-magnetic fraction, which is described hereinafter. This combined stream goes through a second crusher where scrap pieces are further reduced in size and again separated into "dust" or fines, a light and a heavy fraction. The heavy fraction is subjected to a second magnetic separation and the second magnetic fraction is recovered as a ferrous product. Optionally, this product may be sorted to remove any copper-containing pieces and these pieces recycled to the second crusher. The second non-magnetic fraction is combined with the non-magnetic fraction from the first magnetic separation and the combined fractions are fed to the second crusher.

This process is repeated with the scrap pieces becoming smaller and smaller and with magnetic separation after each crushing for the removal of magnetic material. When the desired degree of separation of ferrous from non-ferrous components has been achieved, the copper, aluminum, etc. may be recovered from the non-magnetic fraction by any of the known methods of the prior art such as sink-float, froth flotation, shaking tables, etc. or by the unique recovery system which will be described below.

Accordingly, it is an object of this invention to provide a method and apparatus for freezing scrap containing components which are rendered brittle by freezing, then crushing the scrap material to a smaller size amenable to magnetic and gravity separation and to separate the size-reduced scrap into "dust" or fines, a first light and a first heavy fraction, separating said heavy fraction magnetically into a magnetic and non-magnetic fraction, crushing the non-magnetic and first light fraction to a smaller size, separating to recover "dust" or fines, a second heavy and a second light fraction and continuing the sequence until the desired degree of separation of magnetics from non-magnetics is achieved.

It is a further object of the invention to employ an air separator in the gravity separating step.

Still another object of the invention is to separate the constituents of a scrap feed into its respective constituents as products of the process.

It is also an object of the invention to employ, as feed material for the process, scrap material containing appreciable amounts of copper and/or other non-ferrous metals intermingled with ferrous metal.

These and other objects of the invention will become apparent to those skilled in the art from the following description of the invention and the claims.

DESCRIPTION OF THE DRAWING

The sole FIGURE is a schematic flow diagram of an embodiment of the process.

DESCRIPTION OF THE INVENTION

While the invention is broadly applicable to metallic scrap material of widely varying composition, it will be described with specific reference to a selected scrap having a relatively high copper content. Other nonferrous metals such as aluminum, zinc or precious metals may also be present. The scrap employed in the following description consists of a mixture of junked automobile generators, voltage regulators, electric motors, armatures, scrap electrical wire, electronic devices, relays and the like having a relatively high copper content, an appreciable quantity of aluminum, organic insulating material, a large percentage of ferrous material and small quantities of other metals.

The scrap is fed into freezing zone 1 where it is contacted with a cryogenic fluid such as, for example, liquid nitrogen and is cooled down to below the transition temperature of the ferrous matrix of the scrap (e.g. below about −100°F) to render the ferrous and organic components brittle. The specific nature of the freezer which achieves cryogenic temperatures may vary. It may utilize direct or indirect heat exchange with single cryogenic fluids (e.g. liquid $CO_2$, liquid nitrogen, liquid air, etc.) or different cryogenic fluids in tandem. Furthermore, part of the heat may be removed with mechanical refrigeration cycles.

The cooled scrap is conveyed by conventional means, such as a chute or conveyor 2, to a mill 3 where the scrap experiences its first size reduction (e.g., to pieces no larger than 3 inches in their smallest dimension). The frozen ferrous and organic material shatters under the heavy impact, but those metals which remain ductile under cryogenic conditions are, by and large, merely deformed. A mill suitable for use in this application is a reversible hammer mill as described on page 2 of Bulletin 762 published by Williams Patent Crusher and Pulverizer Co., Inc.

Any insulation present is separated from its substrate as a result of the impact and crushing action. Dust (as used henceforth herein, "dust" is intended to include those fines which are the natural result of any comminuting operation) resulting from the comminuting operation and consisting largely of metallic fines and organic material (e.g. plastic, wood, paper, plus sand and dirt) is removed overhead from the mill to a conventional dust collecting system via line 4. The dust which is collected in cyclones, bag filters, etc. may be subject to recovery of the metallic and non-metallic components thereof.

The scrap, now reduced in size, leaves mill 3 via conveyor 5 is led to an air separator. Suitable separators are known in the art and are exemplified by those disclosed in U.S. Pat. Nos. 775,965 and 2,791,331. In the separator the scrap falls through a generally transverse air stream and is sorted into a heavy fraction and a light fraction which are removed, respectively, by conveyors 8 and 9. Dust is removed, via line 6, to the collecting system.

The heavy fraction is fed into a conventional magnetic separator 10 and classified thereby into magnetic and non-magnetic fractions. The magnetic fraction leaves on conveyor 12 and may be hand picked, if desired, to remove any magnetic pieces containing nonferrous metals which pieces may then be recycled to hammer mill 13. The remaining magnetic fraction on belt 12 is recovered as a ferrous metal product and may be subjected to additional magnetic separation, if desired.

The light fraction from separator 7, which is on belt 9, and the non-magnetic fraction from separator 10, which leaves the separator via conveyor 11 are combined and fed into a second crusher 13, which may be, for example, a hammer mill or ring crusher. The feed at this point and all subsequent points in the process is at ambient temperatures and there is no persistence in it or cryogenically induced embrittlement. In crusher 13 the size of the particles is reduced to no larger than 2 inches in their smallest dimension. A suitable device for use in this application is the over-running mill shown in FIG. 1723 of the aforesaid Bulletin. Dust is removed via line 14 to the dust collecting system and the size-reduced scrap is conveyed, via line 15, to another air separator, 16.

Second heavy fractions and light fractions are removed from this separator via lines 18 and 19, respectively. Dust is vented via line 17. The heavy fraction is fed into a second magnetic separator 20 and magnetic and non-magnetic fractions are recovered therefrom. The non-magnetics are recycled to the second mill, 13, via conveyors 21, 11 and 9. The magnetic fraction is removed, via conveyor 22, and combined with the magnetic fraction 12 from the first magnetic separator 10. It is also possible, depending on the nature and volume of the scrap, to eliminate separator 20 and effect a second magnetic separation (i.e., the magnetic separation of the discharge from mill 13) by connecting conveyor 18 to the inlet of separator 10.

The light fraction from 16 is fed, via line 19, into a third crusher 23 where dust is removed overhead, via line 24, and the scrap is reduced to particles having a maximum smallest dimension of 1 inch. The reduced scrap is subjected to successive crushing and magnetic separation steps until non-ferrous metals of desired purity (i.e., free of ferrous metal) is obtained. The scrap stream at this point is essentially non-responsive to further magnetic separation, being the end product of a series of successive comminutions and magnetic separations. It is at this point that the stream is ready for the recovery system 37.

In the particular embodiment shown a fourth crusher is used. The maximum 1 inch material from crusher 23 is fed, via line 25, to magnetic separator 26. Nonmagnetic and magnetic fractions are withdrawn, respectively, with conveyors 27 and 28. The magnetic fraction on conveyor 28 goes to a second magnetic separator 29 and a product magnetic fraction is removed via line 30. This dual magnetic separator technique can be used with any ferrous stream to improve separation efficiency. The non-magnetic fraction from separator 29 is removed, via line 31, and combined with the nonmagnetic fraction in line 27 and is fed thereby to a crusher 32. Dust from the crusher enters the dust collection system through vent 33.

The comminuted material leaves the crusher, via line 34, and enters a magnetic separator 35 which separates magnetic from non-magnetic fractions. A magnetic product stream 38 is withdrawn. The non-magnetic stream is incapable of any further meaningful magnetic separation and accordingly, is sent to the recovery system 37 via line 36.

The recovery system comprises a final comminution with a wire chopper to yield a finely divided intermediate product. The entirety of the product is screened to yield a plurality of uniformly sized streams ranging from fine to coarse. Each of these sized product streams is subjected to a separation based on specific gravity (e.g. using a gravity table such as a Forsberg Model 50 V) to yield the ultimate products desired which were in the original scrap, each of said products being characterizable by its own specific gravity.

While the invention has been described in some detail, many variations are possible using the principles enunciated above. Since all possible variants cannot be described, the true scope of the invention is to be determined from the appended claims giving them an interpretation consistent with the foregoing specification.

We claim:

1. A method for the recovery of components of scrap material having mechanically intermingled ferrous metals, non-ferrous metals and non-metallic materials comprising the steps of:
   a. passing the totality of said scrap through a freezing zone where it is cooled to cryogenic temperatures below the transition temperature of the ferrous matrix of the scrap;
   b. crushing said scrap, while it is in cryogenically embrittled condition, in a first crushing zone, to effect a first size reduction thereof;
   c. separating the discharge from said first crushing zone, in a first separating zone, into a dust, a first light fraction, and a first heavy fraction;
   d. magnetically separating said first heavy fraction into a first magnetic fraction and a first non-magnetic fraction and said magnetic fraction being recovered as a ferrous product;
   e. combining said first non-magnetic fraction with said first light fraction and feeding said combined fractions, at ambient temperatures, to a second crushing zone within which a second size reduction is effected;
   f. separating the discharge from said second crushing zone, in a second separating zone, into a dust, a second light fraction and a second heavy fraction;
   g. magnetically separating said second heavy fraction into a second magnetic fraction and a second non-magnetic fraction, said second magnetic fraction being recovered as a ferrous product;
   h. combining said second non-magnetic fraction with the feed to said second crushing zone to recycle it therethrough;
   i. feeding said second light fraction to a third crushing zone within which a third size reduction is effected;
   j. magnetically separating the size-reduced effluent from said third crushing zone into a third non-magnetic fraction and a third magnetic fraction, said magnetic fraction being recovered as a ferrous product; and
   k. continuing a series of crushings of magnetic fractions in a crushing zone, each followed by a magnetic separation of the crushed effluent into a magnetic product fraction and a non-magnetic fraction, said latter fraction being the feed for the next successive crushing zone, until a non-ferrous product stream is obtained which is essentially incapable of further magnetic separations.

2. The method of claim 1 wherein dust is collected from each of said crushing zones and from said first and second separating zones.

3. The method of claim 1 wherein the cooling in said freezing zone is achieved using at least one cryogenic fluid.

4. The method of claim 3 wherein the separation in said first and second separating zones is effected by having the comminuted scrap fall through a generally transverse air stream.

5. The method of claim 4 wherein non-ferrous metals are recovered from said non-ferrous product stream by (a) chopping said product stream to obtain a finely divided intermediate product (b) screening the entirety of said intermediate product to obtain a plurality of uniformly sized streams ranging in size from fine to coarse and (c) subjecting each of said sized streams to a separation by specific gravity to thus obtain individual non-ferrous products, each having its own characteristic specific gravity.

6. Apparatus for the recovery of components of scrap material having mechanically intermingled ferrous metals, non-ferrous metals and non-metallic materials comprising:
   a. a freezer for reducing the temperature of materials to cryogenic temperatures below the transition temperature of the ferrous matrix of said scrap;
   b. a first crusher for effecting a first size reduction of said scrap, while it is cryogenically embrittled;
   c. means for conveying the totality of said scrap through said freezer and to said first crusher;
   d. a first air separator which utilizes a stream of air to separate scrap from said first crusher into a dust, a first light fraction and a first heavy fraction;
   e. means for conveying the comminuted material from the first crusher to the first air separator;
   f. a magnetic separator for separating said first heavy fraction into a first magnetic ferrous product fraction and a first non-magnetic fraction;
   g. means for conveying said first heavy fraction to said magnetic separator;
   h. a second crusher for crushing said first light fraction and said first non-magnetic fraction to reduce their size;
   i. means for conveying said first light fraction and said first non-magnetic fraction to said second crusher as a feed therefor;
   j. a second air separator which utilizes a stream of air to separate effluent from said second crusher into a dust, a second light fraction and a second heavy fraction;
   k. means for conveying the discharge of said second crusher to said second air separator;
   l. a magnetic separator for separating said second heavy fraction into a second magnetic ferrous product fraction and a second non-magnetic fraction;
   m. means for conveying said second heavy fraction to separator (l);
   n. means for conveying said second non-magnetic fraction to said second crusher as part of the feed therefor;

o. a third crusher for crushing said second light fraction to reduce the size thereof;
p. means for conveying said second light fraction to said third crusher;
q. a magnetic separator for separating the effluent of said third crusher into a third magnetic ferrous product fraction and a third non-magnetic fraction which fraction is an intermediate product consisting essentially of non-ferrous metals, and
r. means for conveying the discharge of said third crusher to separator (q).

7. The apparatus of claim 6 which further includes dust collecting means operatively associated with each of said crushers and each of said air separators.

8. The apparatus of claim 6 wherein means are provided for eliminating magnetic separator (l), said means comprising a conveyor for taking all of the said second heavy fraction to magnetic separator (f).

9. The apparatus of claim 8 which further includes dust collecting means operatively linked to each of said crushers and each of said air separators.

* * * * *